3,325,515
COUMARIN DERIVATIVES AND THEIR
PREPARATION
Josef Schmitt, L'Hay-les-Roses, and Marcel D. P. Brunaud, Paris, France, assignors to Etablissements Clin-Byla, Paris, France, a company of France
No Drawing. Filed Mar. 27, 1964, Ser. No. 355,450
Claims priority, application France, Apr. 3, 1963, 930,309
9 Claims. (Cl. 260—343.2)

This invention relates to coumarin derivatives and, in particular, provides a series of novel coumarin derivatives which exhibit anti-coagulant activity and have the formula:

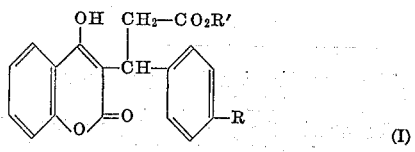

in which R represents a hydrogen atom, a chlorine atom or a methoxy group and R' represents a lower alkyl group, preferably an alkyl group having from 1 to 3 carbon atoms. The invention includes the salts resulting from the substitution of the hydrogen in the OH group by a metal, preferably an alkali metal.

The invention also provides a process for the production of coumarin derivatives having the above general formula which comprises heating a lactone having the following general formula:

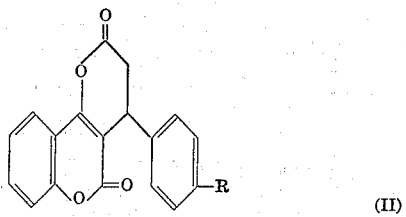

wherein R has the significance ascribed above, in a lower alkanol in the presence of an esterification catalyst.

Preferably the reaction is carried out at reflux temperature in the presence of a stoichiometric excess of the alkanol and suitable esterification catalysts are strong acids, for example, sulphuric acid.

After concentrating the reaction mixture and washing with water to remove the acid catalyst, the desired coumarin derivative is obtained by crystallization in a good yield. The coumarin derivative reverts to the lactone from which it is derived on heating to a temperature slightly above its melting point. The lactones of the above general formula in which R represents a chlorine atom or a methoxy group are novel compounds and form part of the invention. The third lactone represented by the above formula is a known compound and is described, together with a rather complicated method of preparation, in the Journal of Organic Chemistry, 1962, vol. 2, page 3086. All three lactones are readily purifiable and very heat-stable.

We have now found that the lactones having the above formula, including the known lactone, can conveniently be prepared by a process which avoids the use as starting materials of substituted malonic acids which are inconvenient to prepare and handle and are employed in the known method referred to above.

Our new process comprises heating phenol with an ester having the formula:

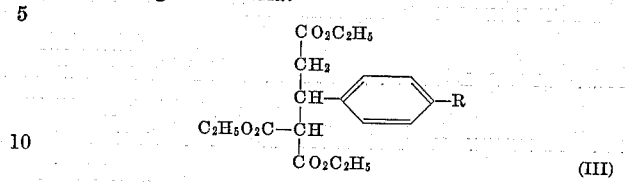

wherein R has the significance ascribed above; the temperature of the reaction mixture preferably being raised rapidly to a temperature in the range 240° C.–280° C.

The ester of the above formula in which R represents hydrogen is a known substance (Organic Reactions, volume X, page 179) and can be prepared by a reaction of ethyl malonate and ethyl cinnamate. A similar procedure can be used to prepare the esters in which the phenyl nucleus has a chlorine atom or a methoxy group in the para-position.

There are three stages in the reaction of the ester with phenol to form the corresponding lactone but there is no need to isolate the intermediates.

At temperatures below 200° C., one of the ester groups reacts with the phenol hydroxyl group with the elimination of an alcohol molecule and the formation of an intermediate having the following formula:

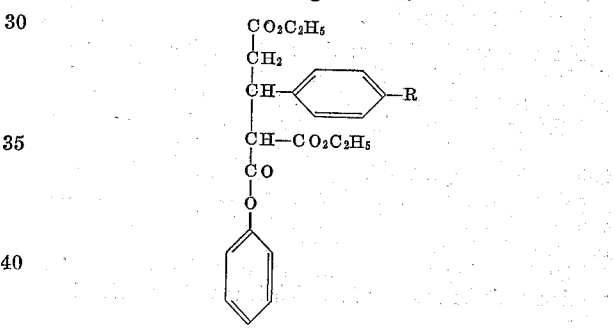

In the second stage, coumarin derivative of the Formula I, in which R' represents ethyl, is formed at temperatures between 240° C. and 280° C. with the elimination of a second molecule of alcohol but is unstable at its formation temperature and a third molecule of alcohol is eliminated substantially simultaneously with the formation of a lactone of Formula II. The reaction rate is increased by an excess of phenol, the excess being dependent upon the reflux rate of the fractionating column used to separate the ethanol formed from entrained phenol. A systematic study of the reaction conditions shows that the temperature should be raised as rapidly as possible to 270° C. which is the optimum value for the second stage of the reaction; above this temperature secondary reactions occur which reduce the yield. When the calculated quantity of ethanol has been collected at the top of the column, most of the exces phenol is distilled off, and the residue is triturated with a suitable solvent to yield a lactone of Formula II in an approximately 80% yield.

The coumarin derivatives of Formula I exhibit anti-coagulant activity and the degree of activity of some typical compounds is given in the following table in which their activity is compared with that of Coumadin (3-α-phenyl-β-acetylethyl-4-hydroxycoumarin) and of ethyldicoumarol which are known anti-coagulants. Figures are also given for the parent acid which has the Formula I in which R and R' are both hydrogen.

| Identification number of compound | Compounds of the general formula I wherein; | | Quick's time in seconds | |
|---|---|---|---|---|
| | R is— | R' is— | Single administration | Administration for 4 consecutive days |
| 2948 CB | H | H | Water, 14.9. Coumadin, 60.3. 2948 CB, 16. | Water, 16.4. Ethyl-dicoumarol acetate, 37.6. 2948 CB, 16.1. |
| 2953 CB | H | CH$_3$ | Water, 14.9. Coumadin, 63. 2953 CB, 73. | Water, 16.4. Ethyl-dicoumarol, 37.6. 2953 CB, does not coagulate. |
| 2952 CB | H | C$_2$H$_5$ | Water, 13.2. Coumadin, 53.8. 2952 CB, 15. | Water, 12.1. Ethyl-dicoumarol, 15.3. 2952 CB, 62.9. |
| 3526 CB | H | n-C$_3$H$_7$ | Water, 15.2. Coumadin, 27.6. 3526 CB, 15. | |
| 3579 CB | Cl | CH$_3$ | Water, 18.6. Coumadin, 39.4. 3579 CB, 39.9. | |
| 4050 CB | OCH$_3$ | CH$_3$ | Water, 18. Coumadin, 34.8. 4050 CB, 28.1. | |

The anti-coagulant activity was determined by measurement of the "prothrombin time" in the normal white rat. Adult male and female rats which have been fastened for 18 hours are divided into batches of five animals and each batch given per one of the following doses:

Bicarbonated water—10 ml./kg. (control batch)
Coumadin—5 mg./kg. (reference batch)
The substance being studied—5 mg./kg. (except in the case of substance 2948 CB where the dose administered is 150 mg./kg.).

The rats are bled from the aorta 24 hours after the single administration. Blood sampled with a 4% aqueous sodium citrate solution (0.5 ml. of blood) is centrifuged and the prothrombin time is found from the plasma thus prepared by Quick's method (The American Journal of Clinical Pathology, 1945, 15, 560). A dose of 150 mg./kg. per day of 4 consecutive days was given of some of the compounds, and the reference compound in the cases was the same dose of ethyl-dicoumarol.

The following examples will serve to illustrate the invention and the manner in which it may be carried into effect.

EXAMPLE 1

(a) *3,10-dioxo-1-phenyl-4,9-dioxa-1,2,3,4,9,10 - hexahydro phenanthrene (the lactone of Formula II in which R is hydrogen).*—816 g. (2.4 mol) of 2-phenyl-1,1,3-triethoxycarbonyl propane and 340 g. (3.6 mol) of phenol are introduced into a reactor having a sealed mechanical agitator and a thermometer, the top of the reactor having fitted to it a 12-plate fractionating column terminating in an analyser supplied with water at 80° C. Heat is supplied as rapidly as possible by means of electrical heating elements. When the temperature of the reaction mixture reaches 150° to 160° C., the ethanol formed in the reaction starts to reflux from the column; above 220° C., a temperature which is reached in 15 minutes, the ethanol flows out of the analyser. After 45 minutes the temperature of the mixture has reached 270° C. and this temperature is maintained throughout the reaction—i.e., for 7½ hours: the volume of alcohol collected is 390 ml. (calculated: 420 ml.). The column is replaced by a distillation condenser and most of the excess phenol is distilled off in vacuo. 500 ml. of isopropyl ether are added to the still hot mixture and the resulting solution is left overnight to crystallise. The mixture is centrifuged, washed with ethyl ether and dried at 50° C. in vacuo. 550 to 590 g. representing a yield of from 80% to 85%, of a yellowish-brown product are obtained having a melting point of from 180 to 182° C. (Kofler's bench) which can be used without purification in the preparation of the coumarin derivatives of the invention.

To obtain the product in pure form, it is crystallised from acetic acid or distilled at from 250°C. to 260° C. and 0.1 mm. of mercury. The colourless crystals so formed melt at 187° C. (in a capillary tube).

(b) *3-(2-methoxycarbonyl-1-phenyl ethyl) 4-hydroxy 2-oxo 2-chromene (2953 CB) (or 3-(4-hydroxy-3-coumarinyl) 3-phenyl 1-propionic acid methyl ester).*— 880 g. (3 mol) of lactone prepared as described in (a) are heated under reflux in 9 litres of methanol and 90 ml. of 66° Bé. sulphuric acid. The lactone used dissolves gradually. Heating under reflux is continued for 3 hours after dissolution and the solvent is then evaporated until only a small amount is left. The resulting mixture is taken up in ethyl acetate, and the solution is washed with water until neutral, then dried on sodium sulphate. It is concentrated to a reduced volume and left to crystallise. 920 g. (83% yield) of white crystals having a melting point of from 130 to 132° C. are obtained.

EXAMPLE 2

The procedure described in 1(b) above was repeated except that the methanol was replaced with an equivalent amount of ethanol and the corresponding ethyl ester (melting point: 125–126° C. after recrystallisation from isopropyl ether) was obtained.

EXAMPLE 3

The procedure described in 1(b) above was repeated except that the methanol was replaced with an equivalent quantity of n-propanol and the corresponding n-propyl ester (3526 CB) (melting point 104° C. to 105° C. after recrystallisation from a mixture of ethyl ether and petroleum ether) was obtained.

EXAMPLE 4

The procedure described in 1(a) above was repeated except that 2-(4-chlorophenyl) 1,1,3-triethoxy-carbonyl propane was substituted for the 2-phenyl-1,1,3-triethoxy carbonyl propane. The resulting lactone is 1-(4-chlorophenyl) 3,10-dioxo-4,9-dioxa-1,2,3,4,9,10-hexahydro phenanthrene which has a melting point of from 192° C. to 194° C. (recrystallised from acetic acid). From this lactone and using methanol as in the procedure described in 1(b), 3-(4-hydroxy 3-coumarinyl)-3-(4-chloro-1-phenyl) 1-propionic acid methyl ester (3579 CB) was produced which melted at 154° C. after recrystallisation from isopropyl ether.

EXAMPLE 5

Following the procedure described in 1(a) above but replacing the 2-phenyl 1,1,3-triethoxy carbonyl propane with 2-(4-methoxy phenyl)-1,1,3-triethoxy carbonyl propane, 1-(4-methoxy phenyl) 3,10-dioxo-4,9-dioxa 1,2,3,4, 9,10-hexahydro phenanthrene was prepared and melted at 144° C. (recrystallised from benzene).

From this lactone and using methanol and following the procedure described in 1(b) above, 3-(4-hydroxy 3-coumarinyl) 3-(4-methoxy phenyl) 1-propionic acid methyl ester was prepared which melted at 122° C. to 123° C. after recrystallisation from ethyl acetate.

EXAMPLE 6

*Sodium salt of 3-(4-hydroxy-3-coumarinyl)-3-phenyl-1-propionic acid methyl ester*

To a concentrated solution of the methyl ester in methanol is added, care being taken to avoid any spontaneous heating, the stoichiometric quantity of sodium hydroxide (1 molecule) dissolved in the minimum quantity of methanol. The sodium salt thus formed is precipitated by an addition of anhydrous ether. The mixture is centrifuged and washed with ether. This salt appears in the form of a non-hygroscopic white powder which is very soluble in water and the lower alcohols and which is decomposed by heating at about 200° C. The pH of its aqueous solution is nearly neutral.

As an alternative form of working and to obviate precipitation by ether, the methanol can be evaporated until dry in vacuo at a low temperature and the residual powder can be used as it is. Other salts, more particularly water-soluble salts, can be prepared in a similar way.

Because of their anti-coagulant activity, these various substances, especially the ester produced in Example 1, can be used for the destruction of harmful animals such as rats and mice and the invention includes rodent-killing compositions containing a compound of Formula I in admixture with a rodent bait or other carrier. They can be used as ingested or contact rodenticides. As ingested rodenticide, the compounds can be used as baits in the form, for instance, of a cereal and of a fat containing the active principle in a 0.025% concentration. As contact rodenticide, the novel esters can be used in the form of powders in which the active principle is present in a concentration of some 0.005% in an inert filler such as talc or kaolin or starch.

To increase the activity of the novel esters, they may usefully be associated in rat-killing formulae with anti-bacterial products whose function is to reduce or inhibit the growth of bacteria producing substances with a vitamin K action in the digestive tract of the animals to be destroyed. These antibacterial products may belong inter alia to the group of nitrofuran derivatives, of antibiotics of fungic orgin and of the sulfamides; of the latter sulphaquinoxaline is very advantageous.

Because of its anti-coagulant properties, the novel esters, especially the ester produced in Example 1 are valuable in human therapeutics, particularly in the prevention and treatment of thrombosis and the invention, therefore, includes a pharmaceutical composition comprising, as the active ingredient, a coumarin derivative of Formula I in admixture with a pharmaceutically acceptable diluent or carrier.

The active coumarin derivatives of the present invention can be formulated in accordance with conventional pharmaceutical practice to prepare dosage forms for parenteral or oral administration, using the diluents and carriers commonly used in the art.

As an anti-coagulant, for example in the treatment of thrombosis, the preferred coumarin derivative, namely 3-(4-hydroxy-3-coumarinyl)-3-phenyl-1-propionic acid methyl ester, may be administered in daily doses of from 2 to 50 mg.

The invention includes a pharmaceutical composition for use as an anti-coagulant in dosage unit form comprising from 1 to 5 mg. of the above methyl ester or a metal salt thereof and a pharmaceutical carrier. The active coumarin derivatives are conveniently administered in tabletted formulations.

What we claim is:

1. A coumarin derivative having the general formula:

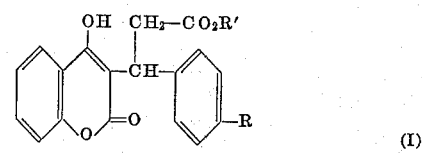

(I)

wherein R' represents an alkyl group having from 1 to 3 carbon atoms and R represents a radical selected from the group consisting of a hydrogen atom, a chlorine atom and a methoxy group, and an alkali metal salt thereof.

2. A process for the production of a coumarin derivative having the general formula:

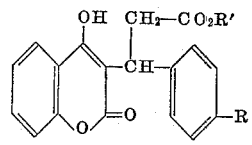

wherein R' represents a lower alkyl group and R represents a radical selected from the group consisting of a hydrogen atom, a chlorine atom and a methoxy group, which comprises heating a lactone having the general formula:

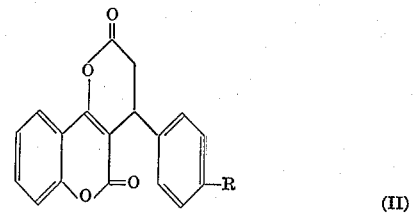

(II)

wherein R has the significance ascribed above, in a lower alkanol in the presence of a strong acid esterification catalyst.

3. A process according to claim 2, wherein the reaction is carried out at reflux temperature.

4. A process according to claim 2, wherein the esterification catalyst is sulfuric acid.

5. A process according to claim 2, wherein the alkanol is employed in stoichiometric excess.

6. A process for the production of a lactone having the general formula:

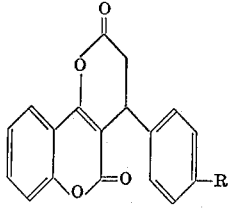

wherein R represents a radical selected from the group consisting of a hydrogen atom, a chlorine atom and a methoxy group, which comprises heating phenol with an ester having the general formula:

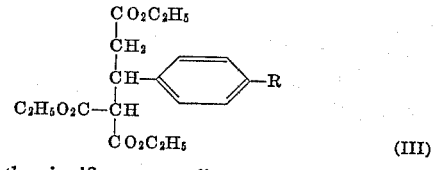

(III)

wherein R has the significance ascribed above.

7. A process according to claim 6, wherein the temperature of the reaction mixture is rapidly raised to a temperature in the range of 240° C. to 280° C.

8. A process according to claim 7, wherein the phenol is employed in stoichiometric excess.

9. A lactone having the general formula:

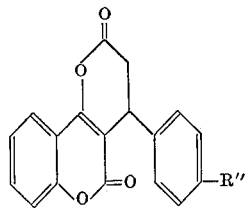

wherein R" represents a radical selected from the group consisting of a chlorine atom and a methoxy group.

References Cited
UNITED STATES PATENTS

| | | | |
|---|---|---|---|
| Re. 25,886 | 9/1965 | Schroeder et al. | 260—343.2 |
| 2,596,107 | 5/1952 | Silverman | 260—343.2 X |
| 2,642,441 | 6/1953 | Seidman | 260—343.2 |
| 2,777,859 | 1/1957 | Link | 260—343.2 |
| 3,097,139 | 7/1963 | Thorp | 167—65 |
| 3,097,213 | 7/1963 | Wiener et al. | 260—343.2 |
| 3,151,025 | 9/1964 | Costello | 167—65 |

OTHER REFERENCES

Anschutz Annalen der Chemie, vol. 367 (1909), p. 176.

WALTER A. MODANCE, *Primary Examiner.*

JULIAN S. LEVITT, JOHN D. RANDOLPH,
*Examiners.*

JEROME D. GOLDBERG, JAMES A. PATTEN,
*Assistant Examiners.*